United States Patent
Ananthapur Bache et al.

(10) Patent No.: US 10,361,509 B1
(45) Date of Patent: Jul. 23, 2019

(54) ADAPTIVE MAGNETIC FIELD ADJUSTMENT FOR PROPER USB EJECTION

(71) Applicant: International Business Machines Corporation, Armonk, NY (US)

(72) Inventors: Vijay Kumar Ananthapur Bache, Bangalore (IN); Vijay Ekambaram, Chennai (IN); Saravanan Sadacharam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/144,237

(22) Filed: Sep. 27, 2018

(51) Int. Cl.
| | | |
|---|---|---|
| *H01R 11/30* | (2006.01) | |
| *H01R 13/62* | (2006.01) | |
| *H01R 13/703* | (2006.01) | |
| *G06F 13/40* | (2006.01) | |
| *G06F 1/16* | (2006.01) | |
| *G05B 19/042* | (2006.01) | |
| *H01R 31/06* | (2006.01) | |
| *H01R 13/639* | (2006.01) | |
| *G06F 3/06* | (2006.01) | |
| *H01R 13/66* | (2006.01) | |

(52) U.S. Cl.
CPC ..... *H01R 13/6205* (2013.01); *G05B 19/0428* (2013.01); *G06F 1/1656* (2013.01); *G06F 3/0619* (2013.01); *G06F 13/409* (2013.01); *H01R 13/639* (2013.01); *H01R 13/7037* (2013.01); *H01R 31/065* (2013.01); *H01R 13/665* (2013.01)

(58) Field of Classification Search
CPC .............. H01R 13/6205; H01R 13/639; H01R 13/7037; H01R 31/065; H01R 13/665; G05B 19/0428; G06F 1/1656; G06F 3/0619; G06F 13/409
USPC ...................................................... 439/38–40
See application file for complete search history.

(56) References Cited

U.S. PATENT DOCUMENTS

| | | | |
|---|---|---|---|
| 7,963,773 B2 | 6/2011 | Palli et al. | |
| 8,351,178 B2 | 1/2013 | Chen et al. | |
| 2008/0214022 A1* | 9/2008 | Kowalick | H01R 13/443 439/34 |
| 2009/0184932 A1 | 7/2009 | Alten | |
| 2010/0317215 A1* | 12/2010 | Chang | H01R 13/6397 439/305 |
| 2011/0124210 A1* | 5/2011 | Lai | G06F 1/1632 439/131 |
| 2013/0083472 A1 | 4/2013 | McMaster et al. | |

* cited by examiner

*Primary Examiner* — Khiem M Nguyen
(74) *Attorney, Agent, or Firm* — Scully, Scott, Murphy & Presser, P.C.; Michael Petrocelli, Esq.

(57) ABSTRACT

A method, system and computer program product for programmatically adapting a magnetic field in a USB port for controlling USB device ejection from an adaptor port. The magnetic field is adapted based on the criticality of the tasks being performed in USB/pen drive/external hard-disk so as to prevent data-corruption and improve user experience (easy pull-off during non-critical tasks).

20 Claims, 5 Drawing Sheets

… (1) …

ADAPTIVE MAGNETIC FIELD ADJUSTMENT FOR PROPER USB EJECTION

FIELD

The present disclosure relates to computer systems and devices that interface with external hard-disk drives or like storage media such as Universal Serial Bus (USB) thumb drives, and more particularly, to a system and method using magnetism for controlling ability to eject, i.e., remove, a USB drive from a USB port based upon monitored event tasks.

BACKGROUND

Currently, in order to properly remove a Universal Serial Bus (USB) thumb drive or an external hard-disk drive or like storage media from a USB port, it has to be removed after the system conducts a proper software un-mounting. Otherwise, if the USB or like thumb drive is improperly ejected without conducting or completing an un-mounting, it could lead to data corruption.

The risk is greater when critical tasks (like copying, formatting, etc.) performed at the computer device using the USB drive are interrupted due to improper USB ejection.

SUMMARY

A system and method that uses a magnetic field technique to prevent a risk of corrupting data from improperly disconnecting USB drives from their USB ports.

In one aspect, a system and method provides programmatically adapting the magnetic field strength in the USB ports based on the criticality of the tasks running in the external hard-disk to prevent data-corruption.

In one embodiment, there is generated at the USB port a strong magnetic field during critical tasks. A lesser magnetic field strength is created for less critical tasks. This adaptability improves the user experience, e.g., easy pull-off of the USB drive during non-critical tasks.

According to a first aspect of the invention, there is provided a computer system comprising: a control processor; a memory coupled to the control processor, the memory having instructions for configuring the control processor to perform a method; an adaptor port providing a physical interface for receiving a connector of a portable hard-drive device; a controllable magnetic switch situated proximate to the adaptor for imparting a magnetic field at the physical interface, wherein the control processor is configured to: monitor bus carrying signals in the performance of a task involving the portable hard-drive device when connected to the adaptor port; determine a criticality of the monitored task involving the portable hard-drive device; and control the magnetic switch to adjust the magnetic field imparted to the physical interface based upon a determined criticality, the imparted magnetic field of a strength facilitating ejection of the portable hard-drive device from the adaptor port upon determining a non-critical task, and preventing ejection of the portable hard-drive device from the adaptor port upon determining a critical task.

According to a second aspect of the invention, there is provided a method of adjusting an amount of force for ejecting a USB drive from a USB adaptor port. The method comprises: monitoring a bus, using a hardware processor, the bus carrying signals in the performance of a task involving the portable hard-drive device when connected to the adaptor port; determining, using the hardware processor, a criticality of the monitored task involving the portable hard-drive device; and controlling, using the hardware processor, a magnetic switch to adjust a magnetic field imparted to a physical interface of the adaptor port based upon the determined criticality, the imparted magnetic field being of a strength facilitating ejection of the portable hard-drive device from the adaptor port upon determining a non-critical task, and preventing ejection of the portable hard-drive device from the adaptor port upon determining a critical task.

In a further aspect, there is provided a computer program product for performing operations. The computer program product includes a storage medium readable by a processing circuit and storing instructions run by the processing circuit for running a method. The method is the same as listed above.

DETAILED DESCRIPTION

In one embodiment, there is provided a method and system for monitoring tasks happening at a hard-disk drive level of a computer system, particularly, tasks occurring at external removable devices, e.g., a flash memory drives, hard disk drives, USB drives (e.g., USB thumb drive, or like USB compatible device) while connected to a USB port of a computer system. In an embodiment, by monitoring an event bus, and based on the criticality of the monitored tasks involving the USB drive, computer system responsively controls and tailors an amount of force required to eject (e.g., pull) the USB drive from its port.

Figure 1:
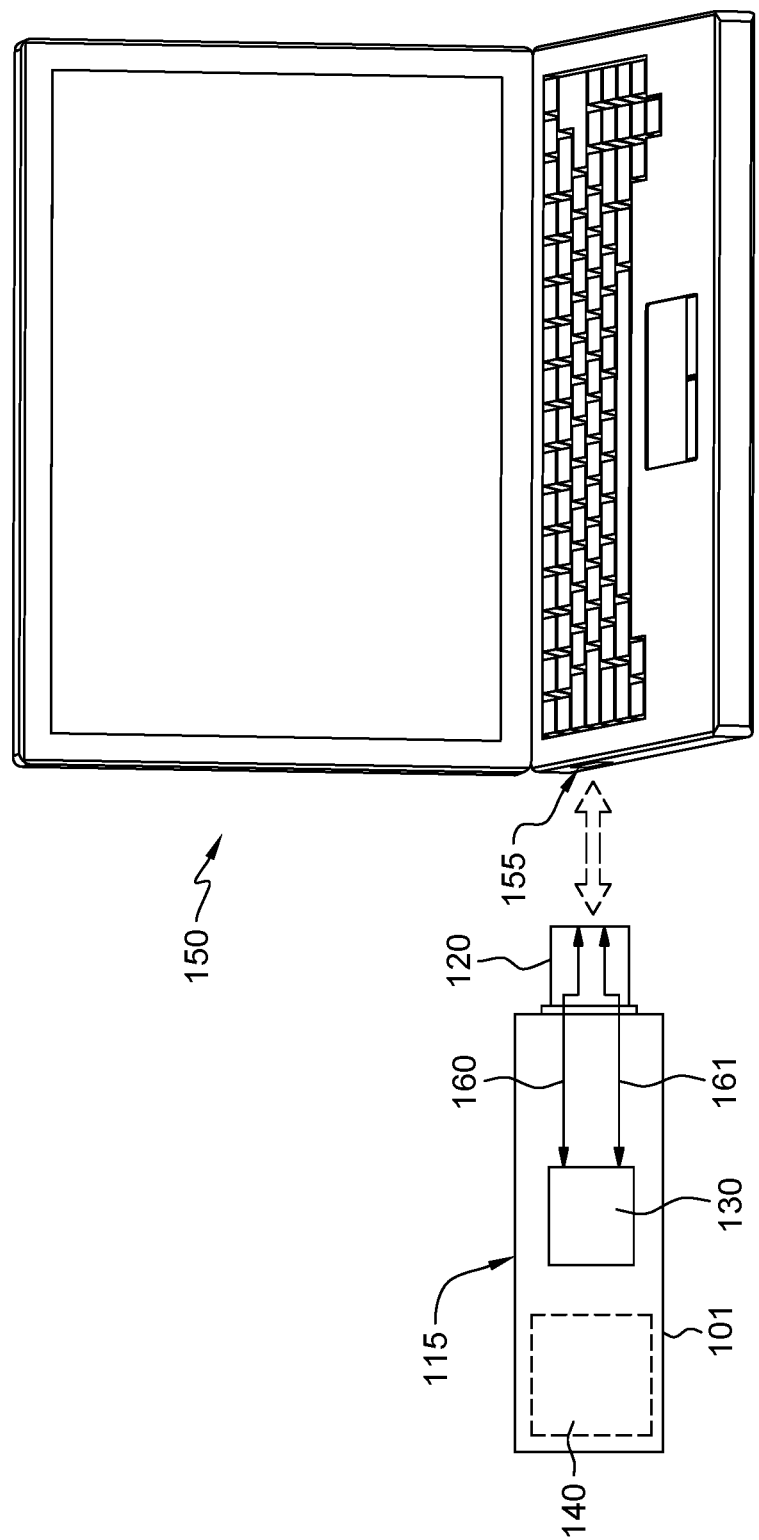
FIG. 1 depicts a system in which the present system and methods for controlling USB ejection force for removing a USB memory thumb-drive device from a corresponding USB receptacle.

FIG. 1 depicts a system 100 in which an external hard-drive such as a USB memory thumb-drive or like USB compatible device 115 connects with a corresponding USB receptacle (socket or port) 155 of a host computer device 150. Port 155 provides a connectable hardware interface to data and control busses at host computer device 150.

The physical USB thumb-drive or like external USB storage device 115 typically comprises a physical housing or jacket 101 and includes cabling (not shown) including a physical wire to provide a constant voltage/power supply to all USB device components, e.g., a memory (e.g., disk-dive, flash-drive) 140, a physical ground conductor, and physical data conductors such as a D+ data line 160 and a D− data line 161 that provide for differential data transmission through respective hardware connector pins (not shown) in a USB drive connector 120 of ferromagnetic material. Connector 120 may include any "mini" or "micro" type USB connector having pins physically connected with the cabling. In one embodiment, USB device 115 includes a transceiver 130 operably connected with memory 140 such that in accordance with a USB communications standard, USB communication of messages and data occurs through many different signaling states on the D+ and D− lines 160, 161.

Figure 2:
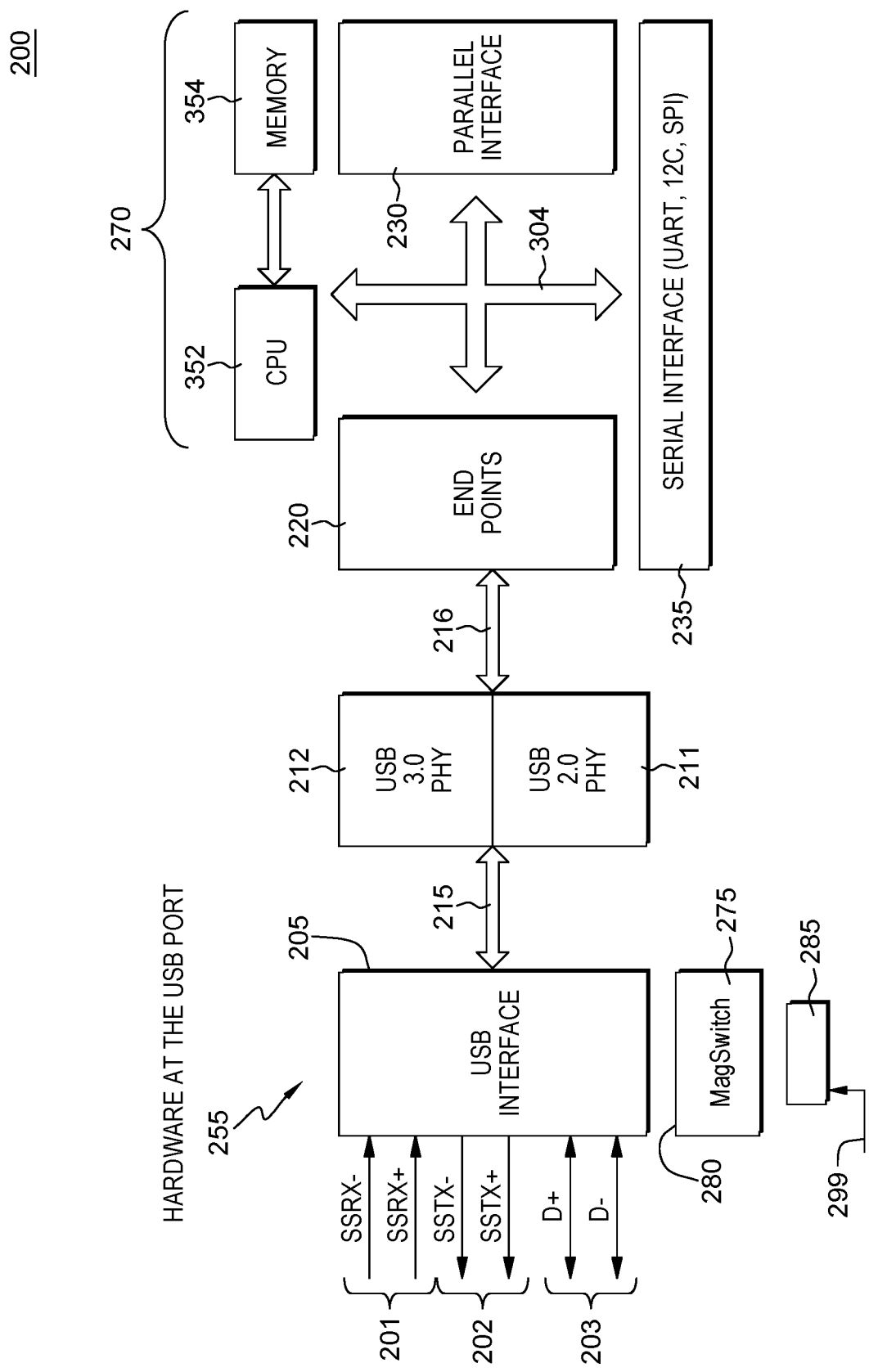
FIG. 2 shows a block diagram of a computer system having a USB socket or USB port and components for controlling the ability to eject a USB device from the USB port in an embodiment.

FIG. 2 shows a block diagram of a computer system 200 having a USB socket or USB port 255 and components for controlling the ability to eject a USB drive from the USB port in an embodiment.

The USB port 255 on the device includes a USB hardware interface structure 205 that physically engages the hardware connector 120 of the USB drive to enable routing of data and transmission signals over signal busses 215, 216 to a root hub, which is an internal hub for connecting the USB port to the host controller and functions as an interface layer to the USB in the system.

The USB interface 205 includes a physical layer (PHY) structure that interfaces with the USB connector and other chip circuitry including hardware buffers defining control and data end points 220. The PHY layer includes USB 2.0 interface 211 to transmit/receive bi-directional (data+ and data−) signals 203 via bus 215 according to a USB 2.0 standard. In addition, a USB 3.0 interface 212 having USB 3.0 compatibility is provided for receiving "super speed" signals 201 from the USB drive or transmitting super speed signals 202 to the USB drive via bus 215. Interfaces 211, 212 provide connections to corresponding signal bus 216 that connect the USB drive with the host system endpoints 220. End points interface with host controller or operating system implemented by a CPU 352 and a memory 354 via internal system data bus 304 that controls USB communication. Via internal communications busses 304 the host computer operating system can send and receive data to or from a buffer endpoint 220 according to various endpoint transfer types, e.g., control transfer, interrupt transfer, isochronous transfer and bulk transfer types. Typically, a USB device is given an address by the host computer 150, which is used in the data communication between that device and the host. These operations can also be performed independent of the host computer operating system. Once data is received at the USB interface 255, it may transferred in parallel to the CPU or a memory storage device via a parallel data transfer interface 230 or transferred as serial data via a universal asynchronous serial transfer (DART) interface device 235 or similar serial transceiver device.

The computer system 200 may be a personal computer (PC), mobile computer device, lap top, etc., including a host controller 270, including the CPU and memory components, that provide a software driver layer that is responsible for tasks such as: detecting an attachment and a removal of the USB device 115 from its port; managing data flow between the host and the USB devices; managing power provided for the attached devices; and monitoring task activity on a bus 304. Additionally, software driver layer performs adjusting the USB ejection force in accordance with embodiments described herein.

In embodiments, data communicated between the USB device 115 and host 150 may be at various speeds, e.g., 1.5 Mb/s, 60 Mb/s (e.g., USB 2.0 standard), to 625 MB/s (e.g., USB 3.0 standard) and beyond. In an embodiment, USB device communication occurs over logical channels from the host controller to an addressable buffer, i.e., an endpoint, for storing received data from the host and holding any data that is waiting to transmit to the host. There are two types of logical channels: a message channel providing bi-directional message communications for control transfers and are typically used for short, simple commands to the device, and a status response; a stream channel or data pipe connected to an endpoint that transfers data according to one of: isochronous, interrupt, or bulk data transfers. The USB device can have multiple endpoints and each endpoint has a channel associated with it.

In an exemplary embodiment, the USB port 255 includes one or more magnetic switch devices 275 which is juxtaposed next to the physical USB interface 205 and is adapted for controlling a user's ability to remove (eject) a USB drive from its connected USB port. In an embodiment, magnetic switch device 275 is controlled for imparting a magnetic force that is an attractive force, e.g., that pulls the USB hardware connector towards a face 280 of the switch. For example, a single magnetic switch devices 275 may be controlled by software to switch on a sufficient amount of attractive magnetic force between the magnetic switch and the USB connector hardware so as to prevent a pulling (ejection) of the USB device from the port, e.g., when engaging in particular operations. Methods run at the host control system can also tailor the turning on/off of magnetic switch device 275 to control the amount of effort a user may expend in attempting to remove the USB drive from the physical USB port 255.

In an example embodiment, one or more magnetic switches 275 are may be situated in proximity to the USB interface 205 that may each be controlled via software to impart a different magnetic attraction force and each magnetic switch 275. The CPU may control the system to turn on or off one or more of the magnetic switch devices 275 and vary the attracting magnetic force required to eject the USB drive based on the particular operations using the USB drive.

In an embodiment, the magnetic switch 275 can include one or more magnets in a self-contained unit that may be rotated to vary alignment of the magnetic poles for turning on/off the magnetic switch. For example, turning on or off of the magnetic switch can be based on controlling an alignment of the north and south polls of a magnet relative to ferromagnetic structures, e.g., at the magnetic switch sides and the faces. For example, when the magnetic switch device is turned OFF, the magnet's N-S axis is aligned vertically and magnetic flux is shunted from S to N via iron side pieces. Little flux leaves the faces, offering no attraction to an external ferromagnetic material, e.g., iron. However, when the magnetic switch is turned ON, the N-S axis is aligned horizontal and magnetic flux must leave the iron side pieces to reconnect the poles and external ferromagnetic material, e.g., of the USB connector, is then attracted to complete a magnetic circuit.

Turning on/off one or more magnetic switch devices can be used to tailor the amount of attractive force to attract the USB hardware connector when inserted into the USB port 255.

In an embodiment, whenever there is a critical task being performed at the USB device level, then before start of the operation, via software, the magnetic switch 275 can be switched on in order to prevent the user from removing the USB drive. Once the critical task is completed, then again, via software, the magnetic switch 275 can be switched off.

In an alternate embodiment, the turning on/off of the magnetic switch 275 can be controlled via a motor 285, responsive to signals 299 issued by the host controller 270 as driven by the software. The motor may be physically connected to the magnetic switch 275 for actuating the alignment of the poles for turning on/off the magnetic switch.

Figure 3:
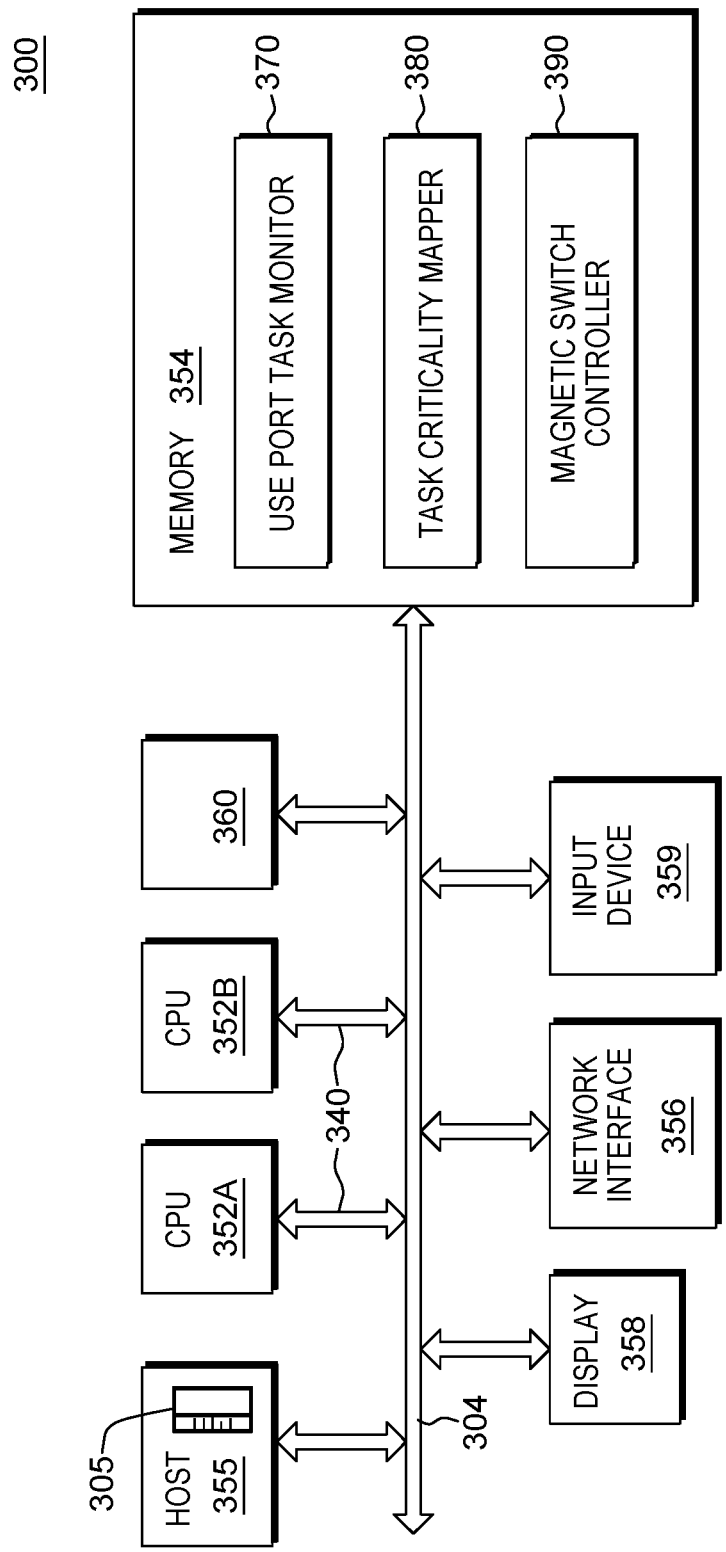
FIG. 3 shows a further example of a computer system in which an embodiment of the invention is employed.

FIG. 3 shows a further example of a computer system 300 in which an embodiment of the invention is employed. In some aspects, system 300 may include a computing device, a mobile device, or a server. In some aspects, computing device 300 may include, for example, personal computers, laptops, tablets, smart devices, smart phones, or any other similar computing device.

Computing system 300 includes one or more hardware processors 352A, 352B, a memory 354, e.g., for storing an operating system and program instructions, a bus 304 that operably couples various system components, including memory 354 to processors 352A, 352B a network interface 356, a display device 358, an input device 359, and any other features common to a computing device. In some aspects, computing system 300 may, for example, be any computing device that is configured to communicate with a web- or cloud-based server 320 over a public or private communications network (not shown). Further, as shown as part of system 300, data may stored locally in an attached memory storage device 360, e.g., a clipboard memory, or stored in an attached, or a remote memory storage device (not shown) and accessed via a remote network connection for input to the system 300.

In the embodiment depicted in FIG. 3, processors 352A, 352B may include, for example, a microcontroller, Field Programmable Gate Array (FPGA), or any other processor that is configured to perform various operations. Additionally shown are the communication channels 340, e.g., wired connections such as data bus lines, address bus lines, Input/Output (I/O) data lines, etc., for routing signals between the various components of system 300 over bus 304. Processors 352A, 352B may be configured to execute method instructions as described below. These instructions may be stored, for example, as programmed modules in memory storage device 354.

Figure 4:
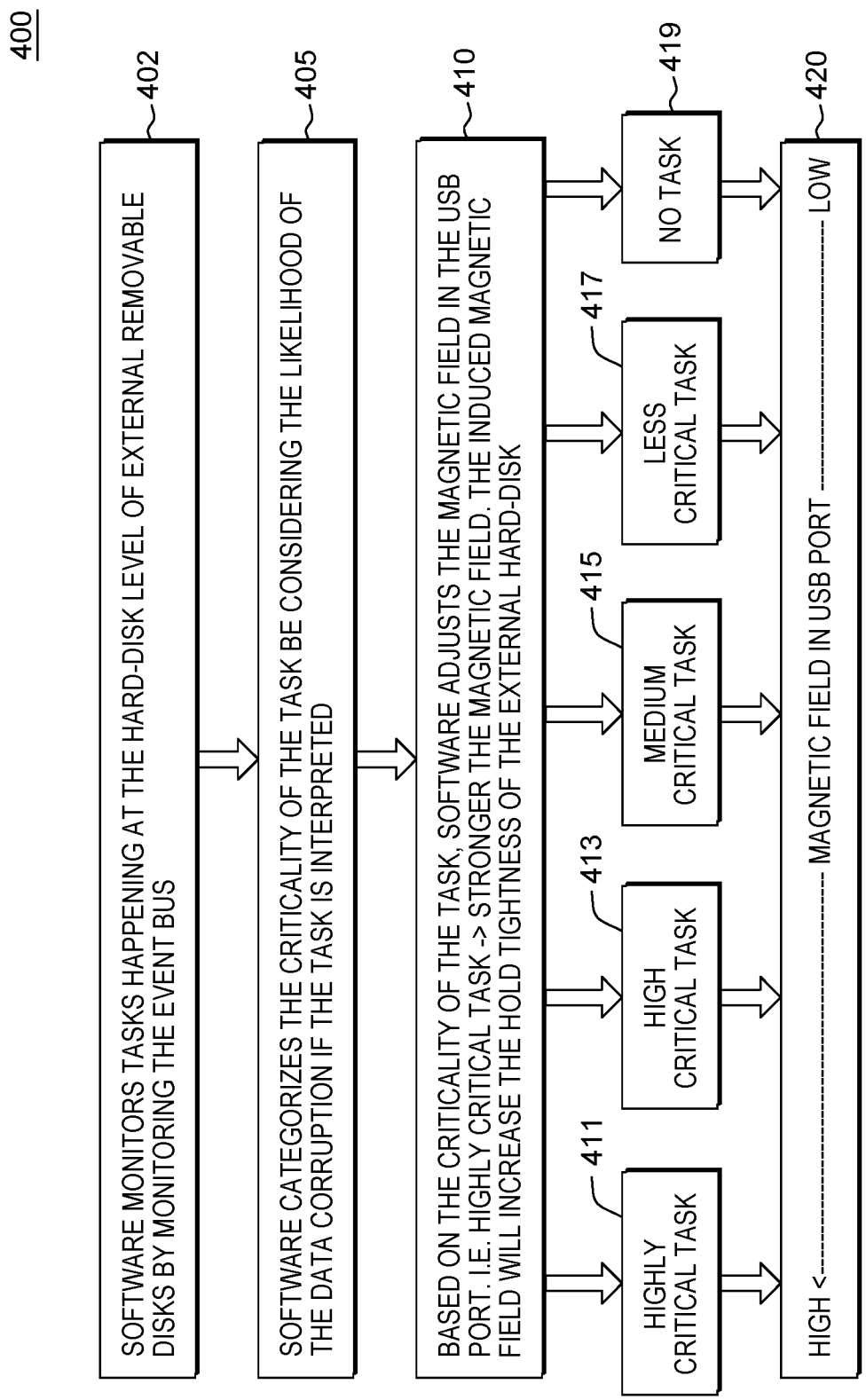
FIG. 4 depicts an overview of a method for automatically preventing ejection of a USB device connected at a port of a computing system according to one embodiment

In some embodiments, the processors 352A, 352B may execute one or more modules that are loaded from memory 354, where the program module(s) embody software (program instructions) that cause the processor to perform the methods of FIG. 4. In some embodiments, program modules may be programmed into the integrated circuits of the processor(s), loaded from memory, storage device, a network and/or combinations thereof.

Bus 304 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system 300 may include a variety of computer system readable media. Such media may be any available media that is accessible by computer system, and it may include both volatile and non-volatile media, removable and non-removable media.

Memory 354 (sometimes referred to as system memory) can include non-transitory computer readable media in the form of volatile memory, such as random access memory (RAM), cache memory and/or other forms. Computer system may further include other removable/non-removable, volatile/non-volatile computer system storage media. By way of example only, storage system 354 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 304 by one or more data media interfaces.

The computer system 300 can communicate with one or more networks such as a local area network (LAN), a general wide area network (WAN), and/or a public network (e.g., the Internet) via network adapter 356. As depicted, network adapter 356 communicates with the other components of computer system via bus 304. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

In an embodiment, network interface 356 is configured to transmit and receive data or information to and from a remote server (not shown), e.g., via wired or wireless connections. For example, network interface 356 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 300 to transmit information to or receive information from a remote server.

Display 358 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 358 may include a liquid crystal display (LCD), an e-paper/e-ink display, an organic LED (OLED) display, or other similar display technologies. In some aspects, display 358 may be touch-sensitive and may also function as an input device.

Input device 359 may include, for example, a keyboard, a mouse, a touch-sensitive display, a keypad, a microphone, or other similar input devices or any other input devices that may be used alone or together to provide a user with the capability to interact with the computing device 300.

Further shown connected to internal data bus is a host USB port 255 and interface 205 that physically interfaces with an external flash drive, i.e., the USB drive 115 of FIG. 1.

With respect to the ability of computer system 300 for modifying a magnetic strength at the USB socket or external hard-drive flash drive socket, the local or remote, memory 354 of computer system 300 stores processing modules that include programmed instructions adapted to invoke operations for analyzing tasks involving a connected USB device, and automatically, in response, change a degree of magnetic field strength generated at the host USB port for preventing removal of the drive dependent upon the criticality of tasks being performed at the system 300.

In one embodiment, one of the programmed processing modules stored at the associated server memory 354 include a USB task monitor module 370 providing instructions that, when run by a processor, configures the host computer operating system to monitor the event data bus(ses) 304 for determining a type(s) of activity, e.g., write or read operation, being performed at the USB drive. In particular, module 270 implements steps for identifying the task at the hard-disk level (of external removable disks) by monitoring messages communicated between the host computer and the USB endpoint.

A further processing module includes a task criticality mapping module 380 providing instructions that, when run by a processor, configures the host computer operating system to determine the criticality of the detected task involving the connected USB drive. The task criticality determiner 380 invokes operations that categorize the criticality of the task by considering the likelihood of the data corruption if the task is interrupted such as by a manual removal or ejection of the USB device. Task criticality mapping module 380 may run methods to build a mapping of detectable tasks, e.g., read operations, write operations, configuration operations, etc. involving the USB device and a corresponding criticality level or criticality degree of that task. The method invokes operations to build a mapping table, which can be accessed once a task is determined to map the detected task to a criticality level.

In one embodiment, a user can interface with system 300 to setup a mapping table of tasks and their corresponding criticality. For example, a user may define a task and its critical vs. non-critical status as these may vary from users to user. For example, some user can view a video file from the USB device which is a "read" operation (task); however the user can configure this task of running a video file from an USB device as a critical task.

A further programmed processing module stored at the associated server memory 354 include a magnetic switch controller 390 that responds to the determined task criticality and automatically generates a signal(s) for use in switching on/off the magnetic switch 275 (of FIG. 2). For example, a signal 299 may be generated for controlling the motor 285 used to set the alignment of magnetic poles of the magnetic switch to turn on/off the switch.

FIG. 4 depicts an overview of a method 400 for automatically preventing ejection of a USB device connected at a port of a computing system according to one embodiment. At 402, USB task monitor software module 270 is run to monitor tasks happening at the hard-disk level of the attached external removable disk or drive by monitoring the event (data) busses 216, 304 at the host. Then, at 405, task criticality determiner module 380 performs categorizing the criticality of the task by considering the likelihood of the data corruption if the task is interrupted. Based on the criticality of the task, magnetic switch controller 390 software adjusts the magnetic field of the magnetic switch 275 to achieve a corresponding magnetic pull force at its face closest to the USB port based on the task criticality. For example, at 410, software is used to control imparting a stronger magnetic field at the USB port via magnetic switch 275 in response to a highly critical task such that the induced magnetic field will increase the hold tightness of the external hard-disk within the USB port.

Figure 5B:
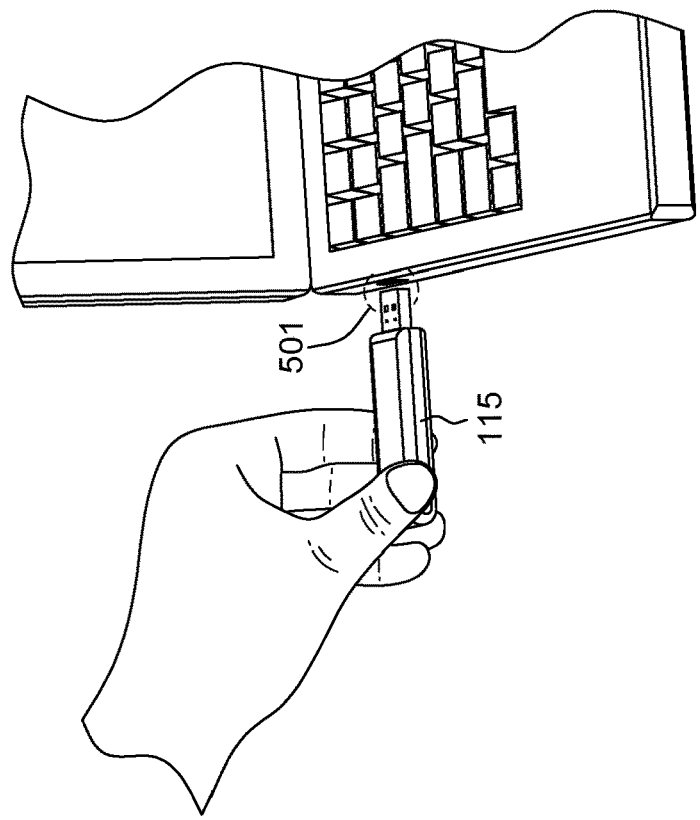
FIG. 5B depicts the inducing of a weaker magnetic field force enabling ejection of the USB drive upon detection of running a non-critical task.
Figure 5A:
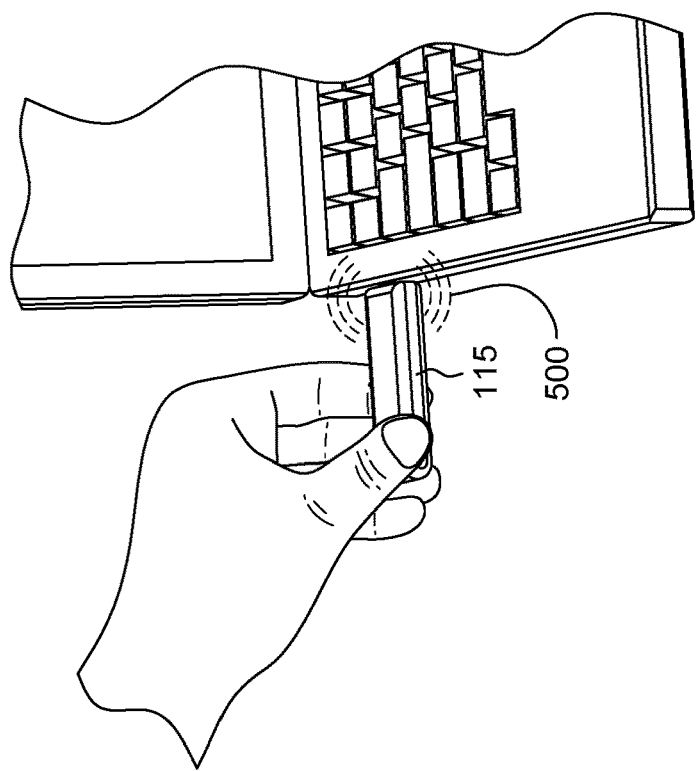
FIG. 5A depicts the inducing of a greater magnetic field force preventing ejection of the USB drive upon detection of running a critical task.

For example, as shown in FIG. 4, based on detected task categories such as "highly critical" 411, "high critical" 413, "medium critical" 415, "less critical" 417 and "no task" 419, at 420, the software will accordingly control the magnetic field imparted by the magnetic switch at the USB port. Thus, if a user tries to remove the external USB hard-disk drive during performing of critical tasks, the induced magnetic field will create tight hold which will make it difficult for an end-user to remove it, thereby preventing data-corruption. As an example, a data write operation is determined as a critical task, i.e., such as when data is being copied from/to the USB drive, and the induced magnetic field will be maximized to create a tight hold which will make it difficult for an end-user to remove the drive. FIG. 5A depicts the inducing of a greater magnetic field force 500 providing a physical "lock" preventing ejection of the USB drive 115 upon detection of running the critical task. In this embodiment, the magnetic field 500 in the USB port is increased to a high range so that a user couldn't pull the external hard-disk out of the port without proper software un-mounting.

On the other hand, if user tries to remove the external hard-disk during noncritical tasks, the induced magnetic field will be very less which enable the end user to pull the drive off easily, thereby improving the user's experience. As an example, a data read operation is determined as a non-critical task, i.e., such as when data is being read to/from a USB drive, and the induced magnetic field can be minimized to create a loose hold which will make it easy for an end-user to remove the drive. FIG. 5B depicts the inducing of a weaker magnetic field force 501 enabling ejection of the USB drive 115 upon detection of running a non-critical task. During this event, no magnetic field may be created in the USB port. So, if user tries to remove the external hard-disk during non-critical tasks, the induced magnetic field is very less which will make end-user to pull it out of the port easily.

The tailoring of the magnetic field force in the manner described, highly improves end-user experience as compared to the naïve approach of blindly having a constant magnetic field.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer system comprising:
   a control processor;
   a memory coupled to the control processor, the memory having instructions for configuring the control processor to perform a method;
   an adaptor port providing a physical interface for receiving a connector of a portable hard-drive device;
   a controllable magnetic switch situated proximate to said adaptor for imparting a magnetic field at said physical interface, wherein the control processor is configured to:

monitor bus carrying signals in the performance of a task involving the portable hard-drive device when connected to said adaptor port;

determine a criticality of the monitored task involving the portable hard-drive device; and control said magnetic switch to adjust the magnetic field imparted to said physical interface based upon a determined criticality, said imparted magnetic field of a strength facilitating ejection of said portable hard-drive device from said adaptor port upon determining a non-critical task, and preventing ejection of said portable hard-drive device from said adaptor port upon determining a critical task.

2. The computer system of claim 1 wherein said control processor is further configured to:

maintain a mapping of types of tasks involving the portable hard-drive device to categories of criticality when connected to said adaptor port, said control processor determining a criticality according to the mapping.

3. The computer system of claim 2 wherein said control processor is further configured to:

consider a criticality of the task based on a likelihood of a data corruption if the task is interrupted by a physical ejection of said portable hard-drive device from the adaptor port.

4. The computer system of claim 2 wherein said magnetic switch induces a magnetic field of a force sufficient to increase a hold tightness of the said portable hard-drive device when connected to said adaptor port.

5. The computer system of claim 3 wherein said portable hard-drive device is magnetically locked to said adaptor port during a data transfer task.

6. The computer system of claim 5 wherein said data transfer task is part of a write operation.

7. The computer system of claim 5 wherein said portable hard-drive device comprises:

a housing portion;

a memory storage circuit situated in said housing for storing data; and a first data link portion operably connected with said memory storage circuit for transferring data to or from said memory storage circuit, said first data link portion extending to a metallic shell portion of said housing, said adaptor port dimensioned to receive the metal shell portion and having a second data link portion, wherein data is transferred between the first data link portion and the second data link portion while the metallic shell portion is placed within the adaptor port.

8. A method of adjusting an amount of force for ejecting a USB drive from a USB adaptor port, the method comprising:

monitoring a bus, using a hardware processor, the bus carrying signals in the performance of a task involving the portable hard-drive device when connected to said adaptor port;

determining, using the hardware processor, a criticality of the monitored task involving the portable hard-drive device; and controlling, using the hardware processor, a magnetic switch to adjust a magnetic field imparted to a physical interface of said adaptor port based upon the determined criticality, said imparted magnetic field being of a strength facilitating ejection of said portable hard-drive device from said adaptor port upon determining a non-critical task, and preventing ejection of said portable hard-drive device from said adaptor port upon determining a critical task.

9. The method of claim 8 further comprising:

maintaining, in a memory storage unit, a mapping of types of tasks involving the portable hard-drive device to categories of criticality when connected to said adaptor port, said hardware processor determining a criticality according to the mapping.

10. The method of claim 9 further comprising: considering said criticality of the task based on a likelihood of a data corruption if the task is interrupted by a physical ejection of said portable hard-drive device from the adaptor port.

11. The method of claim 9 further comprising: inducing, at said magnetic switch, said magnetic field of a force sufficient to increase a hold tightness of the said portable hard-drive device when connected to said adaptor port.

12. The method of claim 10 further comprising: magnetically locking said portable hard-drive device to said adaptor port during a data transfer task.

13. The method of claim 12 wherein said data transfer task is part of one of: a write operation or a read operation.

14. A computer program product comprising a non-transitory, computer-readable readable medium comprising instructions that, when executed by a hardware processor, configure the processor to perform a method comprising:

monitoring a bus carrying signals in the performance of a task involving a portable hard-drive device when connected to an adaptor port;

determining a criticality of the monitored task involving the portable hard-drive device; and controlling a magnetic switch to adjust a magnetic field imparted to a physical interface of said adaptor port based upon a determined criticality, said imparted magnetic field being of a strength facilitating ejection of said portable hard-drive device from said adaptor port upon determining a non-critical task, and preventing ejection of said portable hard-drive device from said adaptor port upon determining a critical task.

15. The computer program product according to claim 14, further comprising instructions to configure the processor to perform:

maintaining, in a memory storage unit, a mapping of types of tasks involving the portable hard-drive device to categories of criticality when connected to said adaptor port, said hardware processor determining a criticality according to the mapping.

16. The computer program product according to claim 15, further comprising instructions to configure the processor to perform: considering said criticality of the task based on a likelihood of a data corruption if the task is interrupted by a physical ejection of said portable hard-drive device from the adaptor port.

17. The computer program product according to claim 15, further comprising instructions to configure the processor to perform: inducing, at said magnetic switch, said magnetic field of a force sufficient to increase a hold tightness of the said portable hard-drive device when connected to said adaptor port.

18. The computer program product according to claim 16, further comprising instructions to configure the processor to perform: magnetically locking said portable hard-drive device to said adaptor port during a data transfer task.

19. The computer program product according to claim 14, wherein a monitored task comprises one of: a write operation or a read operation.

20. The computer program product according to claim 15, wherein to determine task criticality, said computer readable media comprises further instructions to configure the processor to perform:
- building, in a memory storage unit, a mapping table comprising types of tasks involving the portable hard-drive device to a criticality type when connected to said adaptor port, and
- accessing, in a memory storage unit, said mapping table to look-up a criticality of a detected task.

* * * * *